Dec. 25, 1923.
K. P. McELROY
1,478,750
PROCESS OF AND APPARATUS FOR CONDENSATION
Filed Feb. 9, 1922
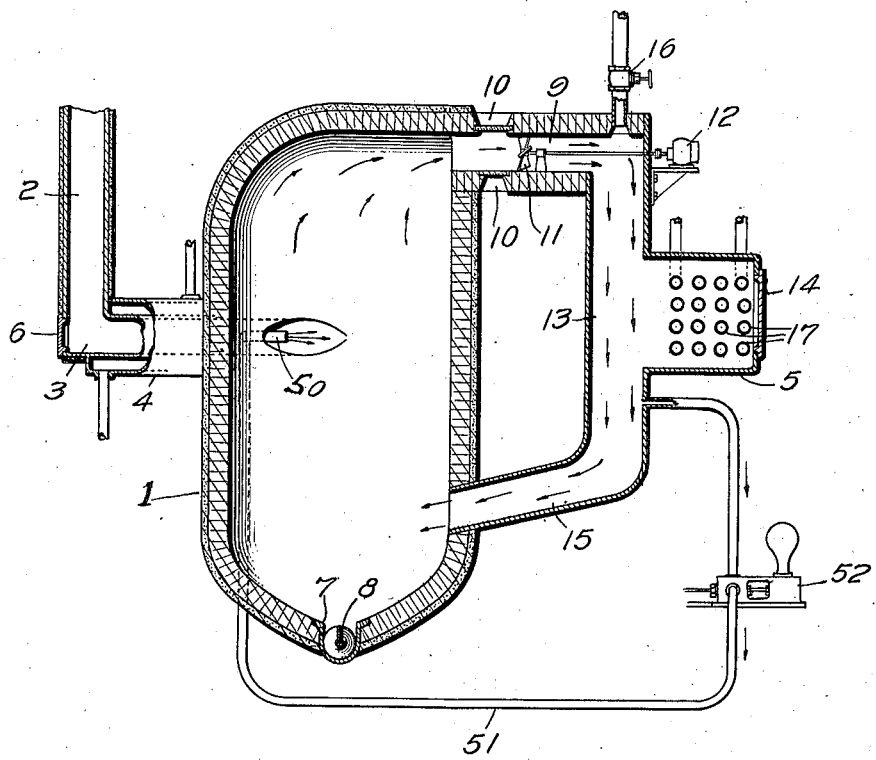
Inventor
K. P. McElroy.

Patented Dec. 25, 1923.

1,478,750

UNITED STATES PATENT OFFICE.

KARL P. McELROY, OF WASHINGTON, DISTRICT OF COLUMBIA, ASSIGNOR TO GULF REFINING COMPANY, OF PITTSBURGH, PENNSYLVANIA, A CORPORATION OF TEXAS.

PROCESS OF AND APPARATUS FOR CONDENSATION.

Application filed February 9, 1922. Serial No. 535,271.

*To all whom it may concern:*

Be it known that I, KARL P. McELROY, a citizen of the United States, residing at Washington, in the District of Columbia, have invented certain new and useful Improvements in Processes of and Apparatus for Condensation, of which the following is a specification.

This invention relates to processes of and apparatus for condensation; and it comprises a method of obtaining solids from their vapors wherein said vapors are introduced laterally into a body of cooled gas, best tangentially, for intermixture therewith, said body being kept in slow upward movement with removal of warm gas at the top, cooling and reintroduction of cooled gas into the base; and it also comprises certain apparatus adapted for use in the performance of said process; all as more fully hereinafter set forth and as claimed.

Ordinary types of condensers are not well adapted to serve with vapors which deposit solids on cooling. In passing through a cold-walled conduit, there is at first a rapid deposition of solids as a coating layer but as this coating thickens deposition becomes slower and may ultimately come to a practical standstill in the case of solids of low heat conductivity. Once formed, the layer acts, so to speak, as a thermal stabilizer in fixing and maintaining the temperature of the passing vapors at some certain point; an increase in temperature resulting in volatilization of solids with absorption of heat and vice versa. These considerations are particularly applicable in the manufacture and recovery of aluminum chlorid from its vapors; an operation which now presents considerable difficulty. Aluminum chlorid, which is now largely used in various processes of refining oil, is customarily made by treating alumina (beauxite) with chlorin in the presence of carbon; by reaction upon aluminum, aluminum carbid, nitrid or sulfid with chlorin or hydrochloric acid, etc. Aluminum chlorid is also recovered by various methods from residues of oil treatments. All these processes deliver a hot mixture of vapors of aluminum chlorid with various gases; and it is a desideratum in the art to be able to cool large volumes of these vapors or vapor gas mixtures quickly, producing solid aluminum chlorid with a minimum of handling and exposure to air, the chlorid being very sensitive to the action of aerial moisture. With moist air it evolves stifling vapors of HCl and is broken down. On contact with a cold surface hot chlorid vapors at first deposit a spongy crystalline layer which as it grows in thickness becomes denser and finally hard and impervious; probably because of later depositions coming down transitorily in molten form. These deposits are frequently hard to detach without tools; and the use of tools is inconvenient here. The chlorid is usually removed from the condensers now in use in chunks or large crystals; both of which are inconvenient to handle.

In the present invention I have devised a method of and apparatus for condensing vapors yielding solids, in which I do not bring cooling surfaces directly into contact with the vapors, but use an intermediate body of inert gases to transfer cooling effect from such surface to the vapors. This invention is particularly, but not exclusively, useful as regards condensation of aluminum chlorid vapors. The vapors are introduced into the body of cold gas laterally, mixing with it and giving up their heat, with resultant condensation. Mixing may be very rapid and the condensation equally rapid. The solids produced simply snow down, so to speak, and do not tend to hang to or encrust the walls of the apparatus. And with proper apparatus and manipulation they do not tend to reach the cooling surfaces and put them out of action.

In the condensation of the vapors it is necessary to dissipate large amounts of heat, this heat including the sensible heat down to and somewhat below the boiling or vaporizing temperature of the material and also the latent heat of vaporization; the latter being usually the greater. In the case of pure aluminum chlorid vapors, the temperature of condensation is the same as the boiling point, 365° F. and in the case of mixtures of the vapors with permanent gases it is somewhat below. As aluminum chlorid has a relatively high vapor tension however it is in practice necessary in condensation to cool considerably below 365° F.

In practicing the present invention, I may first transmit the aluminum chlorid vapors if very hot through a cooled conduit of comparatively large diameter (to prevent plugging) to reduce their temperature to the condensation point. In so doing, for reasons stated ante, the vapors automatically set their own temperature; in the case of pure vapors, a temperature of 365° and with vapors and gas mixtures a temperature somewhat below. This temperature of the vapors is of course that of condensation, but to cause substantial condensation and a lowering of temperature, means must be provided to absorb the heat developed in condensation. I therefore pass the heavy but hot vapors into a body of colder gas at a middle point in its height. Preferably they are sent in tangentially to avoid disturbance as much as possible. The heavy vapors mix with the gas with an averaging of temperature between vapor and gas. The resultant temperature of course depends upon the volume of admixed gas and its original temperature. I therefore use comparatively large volumes of gas, both to obtain a sharp drop in temperature and to prevent currents and turbulence. The speed of cooling depends wholly on the rapidity of the mixture with the cold gas, and this can be, and is made, very rapid. Since gases carrying suspended solids are heavier than the same gas without the solids as soon as condensation begins the gas-vapor-solid mixture tends to fall. And the result of the operation, as so far described, is to establish a plane of difference in specific gravity across the body of gas, warm gas being above it and warm, dust-laden gas below it. The introduced hot but heavy vapors tend to spread across along this plane, giving up their heat and depositing the chlorid. As crystallization or deposition invariably takes place preferentially on nuclei, the tendency is to build up finer suspended particles to form heavier, more quickly sinking particles.

In order to make the operation continuous it is necessary to provide means for taking away the heat brought in by the vapors and this I do by a continuous upward movement of the stated body of gas replacing it by colder gas below. The warmed gas is removed at the top, cooled by contact with cold surfaces and returned as the bottom inflow. In so doing while I am virtually cooling the vapors by cold surfaces, such surfaces do not come into actual contact with the vapors, the gas body forming an intermediate heat-transferring means. I keep the upward movement of the gases rather slow so as to allow the described stratification; but whatever the speed of gas flow, it produces in some measure a differential buoying of the finer chlorid particles. By a control of the speed therefore, in a measure I can control the grain size of the deposited aluminum chlorid.

In the accompanying illustration I have shown, more or less diagrammatically, apparatus within the present invention and susceptible of use in performance of the stated process.

The view is in central vertical section, with certain details in elevation.

In this showing element 1 is a condensation chamber of brickwork or concrete. It can be made of metal but in this event it is best heat insulated. Aluminum chlorid vapors from a suitable source (not shown) come through heat insulated conduit 2 to jacketed metal conduit 3. The jacket 4 allows circulation of hot or cold oil as may be expedient. The use of this heat-controlled conduit is not necessary but is often convenient. The conduit, if used as a precooler, should be rather wide in section to prevent plugging. Manhole 6 gives access to this conduit and may be provided with a window (not shown). Vapors from the conduit enter the condensation chamber tangentially. The bottom of the condensing chamber converges to conveyer trough 7 provided with conveyer 8. At a point well above the point of vapor introduction warm gases are led from the condensation chamber through conduit 9. This may be provided with a pair of opposite windows 10 for observation. The gases going past the window should be free of dust. In this conduit is shown fan 11, driven by suitable means 12, for controlling the velocity of gas flow if this be desired. The conduit enters the top of cooling chamber 13 which may be of metal and exposed to the air to promote radiation. As shown this chamber is provided to one side with an offset 5 having a clean-out door 14. Below it is provided with cold duct 15 leading back to the condensation chamber at a point above its bottom. Valved drawoff 16 may be used to dispose of superfluous gases. Within the offset portion 5 of the cooling chamber are cooling pipes 17.

Injector 50 taking cold gas through line 51 and pump 52 may be used to aid in the movement of vapors through the supply line, in quickening dilution with cold gas and in aiding tangential movement of vapors, as well as in giving some degree of whirl to the gas body.

In the operation of the described structure the vapors enter from the precooler tangentially and circle around the walls, tending to spread across the relatively heavy body of dust laden gases below, mixing therewith and being condensed thereby. The dust acts as nuclei in promoting condensation. Warmed gases pass upward while the aluminum chlorid falls as a sort of snow or hail reaching the bottom and being taken away by conveyor 8. The warm gases flow upward and pass out through 9. While there is a straight-way down conduit provided between 9 and 15, free of obstruction, the cooling pipes 17 being located in the offset 5, yet the hot gases tend to accumulate at the top of 13 and the cold gases only are drawn off at 15. The straight-way communication allows any dust which may be present to fall directly without coming in contact with the cooling pipes. By its use collection of dust on the piping is obviated to a large extent. Any such dust as may thus fall goes back to the condensation chamber.

The structure and the operation described are quite as applicable to the manufacture of flowers of sulfur from sulfur vapors, to the sublimation of salammoniac (ammonium chlorid) and to numerous other gases and vapors where a solid is to be precipitated in granular form.

What I claim is:—

1. In the condensation of solids from hot vapors the process which comprises transmitting a current of said vapors laterally into a body of cold gases in slow upward movement.

2. In the condensation of solids from hot vapors the process which comprises transmitting a current of said vapors laterally into a body of cold gases in slow upward movement, removing warmed gases from the top of said body, cooling them and reintroducing into said body near its base.

3. In the condensation of solids from hot vapors the process which comprises precooling a current of said vapors to the condensation temperature and transmitting the precooled vapors laterally into a body of cold gases in slow upward movement, removing warmed gases from the top of said body, cooling them and reintroducing into said body near its base.

4. In the condensation of aluminum chlorid vapors the process which comprises transmitting a current of said vapors laterally into a body of cold gases in slow upward movement, removing warmed gases from the top of said body, cooling them and reintroducing into said body near its base.

5. In the condensation of aluminum chlorid vapors the process which comprises establishing and maintaining a vertical body of cold inert gases in upward movement, transmitting aluminum chlorid vapors laterally into said body, and removing warmed gases from the top of said body and condensed aluminum chlorid at its base.

6. In the condensation of aluminum chlorid vapors the process which comprises establishing and maintaining a body of gases in slow cyclic circulation through a condensation chamber and a cooling chamber, and transmitting aluminum chlorid vapors laterally into said body of gases while moving through the condensation chamber.

7. In the condensation of aluminum chlorid vapors the process which comprises establishing and maintaining a body of gases in cyclic circulation through a condensation chamber, precooling aluminum chlorid vapors to the condensation temperature and transmitting the precooled vapors laterally into said body of gases.

8. An apparatus for condensing solids from vapors comprising a pair of vertical chambers connected at the top and at the bottom, cooling means in one chamber, means for introducing vapors laterally into the other, and means at the base of said other chamber for removing condensed solids.

In testimony whereof, I have hereunto affixed my signature.

K. P. McELROY.